April 26, 1927.
E. M. CHASE
ROTARY PUMP
Filed Aug. 18, 1925
1,626,510
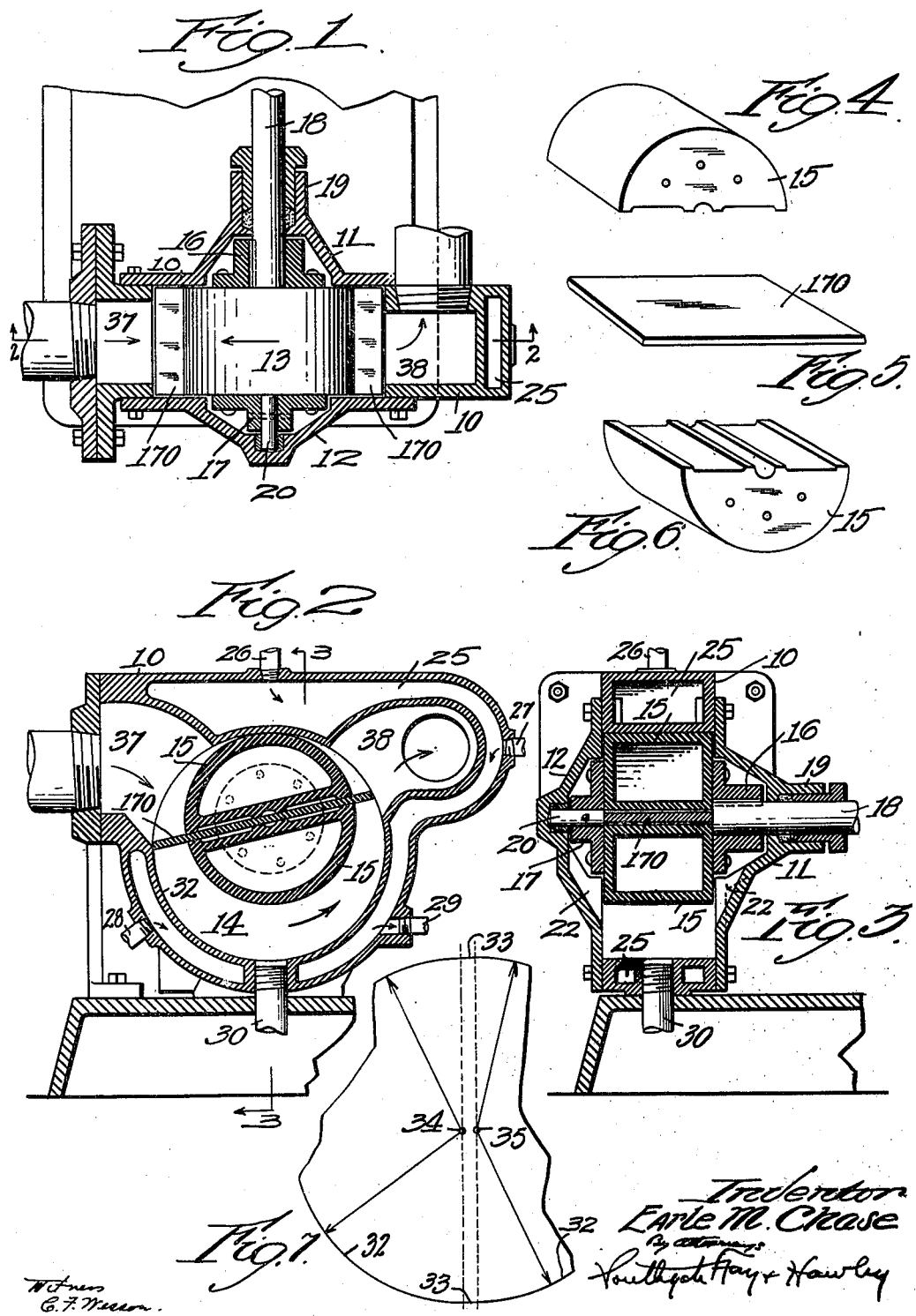

Patented Apr. 26, 1927.

1,626,510

UNITED STATES PATENT OFFICE.

EARLE M. CHASE, OF SPRINGFIELD, MASSACHUSETTS, ASSIGNOR TO UNIVERSAL CANDY AND CHOCOLATE MACHINERY COMPANY, INC., OF SPRINGFIELD, MASSACHUSETTS, A CORPORATION OF MASSACHUSETTS.

ROTARY PUMP.

Application filed August 18, 1925. Serial No. 51,051.

This invention relates to a rotary pump especially adapted for handling chocolate and other thick heavy liquids and semi-liquids. It is the object of my invention to provide a pump for such purposes which is simple in construction and operation, which is easy and economical to manufacture, and which may be easily started under adverse operating conditions.

A further object of my invention is to provide a rotary pump of the sliding plate valve type, in which the pump chamber may be substantially completed in two boring operations.

Further features of my invention relate to the provision of a steam jacket for the pump chamber to prevent cooling and solidifying of the chocolate, to the provision of a large drainage opening through which the entire contents of the pump chamber may be discharged when the sliding plate is in vertical position, and to the provision of a construction in which the sliding plate valve may be of plain rectangular outline, particularly adapted for the handling of chocolate.

My invention further relates to arrangements and combinations of parts which will be hereinafter described and more particularly pointed out in the appended claims.

A preferred form of the invention is shown in the drawings, in which—

Fig. 1 is a sectional plan view of my improved pump;

Fig. 2 is a sectional side elevation thereof;

Fig. 3 is a transverse sectional elevation, taken along the line 3—3 in Fig. 2;

Fig. 4 is a perspective view of one half of the rotary valve support;

Fig. 5 is a perspective view of the sliding valve plate;

Fig. 6 is a perspective view of the second half of the valve support, and

Fig. 7 is a diagrammatic view to be explained.

Referring to the drawings, I have shown a rotary pump comprising a body member 10 to which is bolted inner and outer heads 11 and 12. A rotary valve support 13 is mounted eccentrically within the chamber 14 formed in the pump casing.

The valve support 13 comprises two hollow castings 15 (Figs. 4 and 6) bolted to hubs 16 and 17 by which the members 15 are held in spaced relation, as indicated in Fig. 2. The plate valve 170 is slidably mounted in guideways formed between the members 15 and is retained from axial displacement by the hubs 16 and 17.

The inner hub 16 is keyed or otherwise secured to a driving shaft 18 rotatable in a bearing 19 forming a projection on the casing member or head 11. This bearing 19 is provided with a suitable stuffing box to prevent the escape of melted chocolate along the shaft 18. The other hub 17 of the rotary valve support is mounted upon a stud 20 rotatable in the outer casing member or head 12. The heads 11 and 12 are provided with passages 22 (Fig. 3) by which chocolate accumulating around the hubs 16 and 17 may flow back to the pump chamber.

The body member 10 is provided with a passage 25 which forms a steam jacket for the pump chamber. Inlet and outlet ports 26, 27, 28 and 29 are provided for causing a flow of steam through the passage or jacket 25. By this means the chocolate is maintained in melted condition so that it may be pumped to an associated candy coating machine. A large drainage pipe 30 is provided at the bottom of the pump chamber 14 and is so positioned that the entire contents of the chamber may be removed, if the sliding plate valve 17 is first placed in vertical position.

The pump chamber is preferably formed with two semi-circular end walls 32 spaced apart by very short straight wall portions 33, as indicated in Fig. 7. This construction is important, as it enables me to form my pump chamber complete by two boring or grinding operations, first on the center 34 and thereafter on the center 35. It is then merely necessary to remove the very slight amount of material left in the straight portions 33 in order to produce a completely and accurately finished pump chamber.

I have found that the error produced by this construction is entirely negligible in a pump of this type, provided that the centers are properly chosen and that a sliding valve of the right length is used. The pump casing has a relatively large inlet opening 37 at its upper left hand portion, as viewed in Fig. 2, and a discharge passage 38 in the upper right hand portion of the casing.

Having thus described the construction of my improved pump, the operation thereof will be readily apparent. The rotary valve support contacts with the wall of the pump chamber 32 at its upper portion, thus forming a stop between the inlet and discharge passages. The valve plate 170 slides freely through the valve support 13 as the latter rotates, and maintains substantial contact with the chamber walls at both ends of the valve and in every position thereof. The plate thus acts to sweep portions of chocolate or other material ahead of it as it passes the inlet opening 37 and this material is forced along by the plate until it finally escapes the casing by the discharge passage 38. In the meantime, the other end of the sliding valve has started a second portion of material on its path around the pump chamber.

This type of pump is particularly adapted for use in candy coating machinery, as it has no parts which may become clogged by the chocolate which hardens in the machine while it is out of use. The machine is readily started even if portions of partially unmelted chocolate still remain in the casing, as happens on occasions when the steam in the steam jacket has not acted sufficiently long to melt the entire former contents of the pump.

Having thus described my invention and the advantages thereof, I do not wish to be limited to the details herein disclosed otherwise than as set forth in the claims but what I claim is:—

1. A rotary pump having a pump chamber, a rotary valve support mounted eccentrically in said chamber and contacting at one point with the curved wall of said chamber, a plate valve slidable radially in said valve support, and means to rotate said support and valve, said pump chamber being formed of two semi-circular portions spaced slightly apart and connected by a very short portion having straight walls.

2. A rotary pump having a pump chamber, a rotary valve support mounted eccentrically in said chamber and contacting at one point with the curved wall of said chamber, a plate valve slidable radially in said valve support, and means to rotate said support and valve, said pump chamber having inner and outer casing heads joined by a body member having semi-circular end walls spaced apart by very short straight side wall portions.

3. A rotary pump having a pump chamber, a rotary valve support mounted eccentrically in said chamber and contacting at one point with the curved wall of said chamber, a plate valve slidable radially in said valve support, and means to rotate said support and valve, said pump having a large drainage port at the bottom thereof positioned to drain both sides of the pump chamber when the sliding plate valve is in vertical position.

4. In a rotary pump having a pump chamber, a rotary valve support mounted eccentrically in said chamber and contacting at one point with the curved wall of said chamber, a plate valve slidable radially in said valve support, and means to rotate said support and valve, said pump having a drainage port of a diameter greater than the thickness of said plate valve, at the bottom of said chamber, positioned to drain both sides of said chamber when the sliding plate valve is in vertical position.

5. A rotary pump having a pump chamber, a rotary valve support mounted eccentrically in said chamber and contacting at one point with the curved walls of said chamber, a plate valve slidable radially in said valve support, and means to rotate said support and valve, said support comprising two separate hollow semi-cylindrical members secured to two supporting hubs and spaced apart thereby to provide a guide passage for said sliding plate valve, one hub of the support being mounted on a stud rotatable in the outer casing head of the pump chamber and the other hub being secured to the inner end of a rotary driving shaft.

In testimony whereof I have hereunto affixed my signature.

EARLE M. CHASE.